(12) United States Patent
Nestorovic et al.

(10) Patent No.: US 7,690,799 B2
(45) Date of Patent: Apr. 6, 2010

(54) OPTICAL RELAY FOR COMPACT HEAD UP DISPLAY

(75) Inventors: Nenad Nestorovic, Seattle, WA (US);
Joel E. Hegland, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 12/198,770

(22) Filed: Aug. 26, 2008

(65) Prior Publication Data

US 2010/0053758 A1 Mar. 4, 2010

(51) Int. Cl.
*G02B 27/00* (2006.01)
*G02B 27/01* (2006.01)
(52) U.S. Cl. ...................... 359/601; 359/738
(58) Field of Classification Search ......... 359/601–630, 359/738–740
See application file for complete search history.

(56) References Cited

U.S. PATENT DOCUMENTS 4,261,647 A * 4/1981 Ellis ........................... 359/584

\* cited by examiner

*Primary Examiner*—Darryl J Collins
(74) *Attorney, Agent, or Firm*—Kevin D. Wills

(57) ABSTRACT

Briefly, in accordance with one or more embodiments, an optical relay for a head up display, the optical relay comprises a glare trap having angularly selectivity by being capable of reflecting light having an angle of incidence greater than a first angle, and being capable of transmitting light having an angle of incidence less than a second angle, and a first optic arranged to receive light reflected off the glare trap at an angle of incidence greater than the first angle, and to direct light through the glare trap at an angle of incidence less than the second angle to exit the glare trap.

15 Claims, 4 Drawing Sheets

OPTICAL RELAY FOR COMPACT HEAD UP DISPLAY

BACKGROUND

Head up displays (HUDs) are typically deployed in vehicles such as automobile or aircraft to allow the driver or pilot to view information projected by the display without requiring the driver or pilot to divert his view away from the outside environment. The optical relay design for such a HUD typically magnifies the generated image formed by a scanning display, liquid crystal display (LCD), or the like, and places the apparent magnified image at some distance outside the vehicle in which the HUD is utilized, for example around one and a half meters away from the operator outside the vehicle where the vehicle is an automobile. The optical relay typically involves a sufficient amount of optical path length for the magnification optics which may provide a design constraint on the physical size of the HUD to provide sufficient magnification and other optical properties such as eyebox size, field of view, and/or distant apparent image location.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
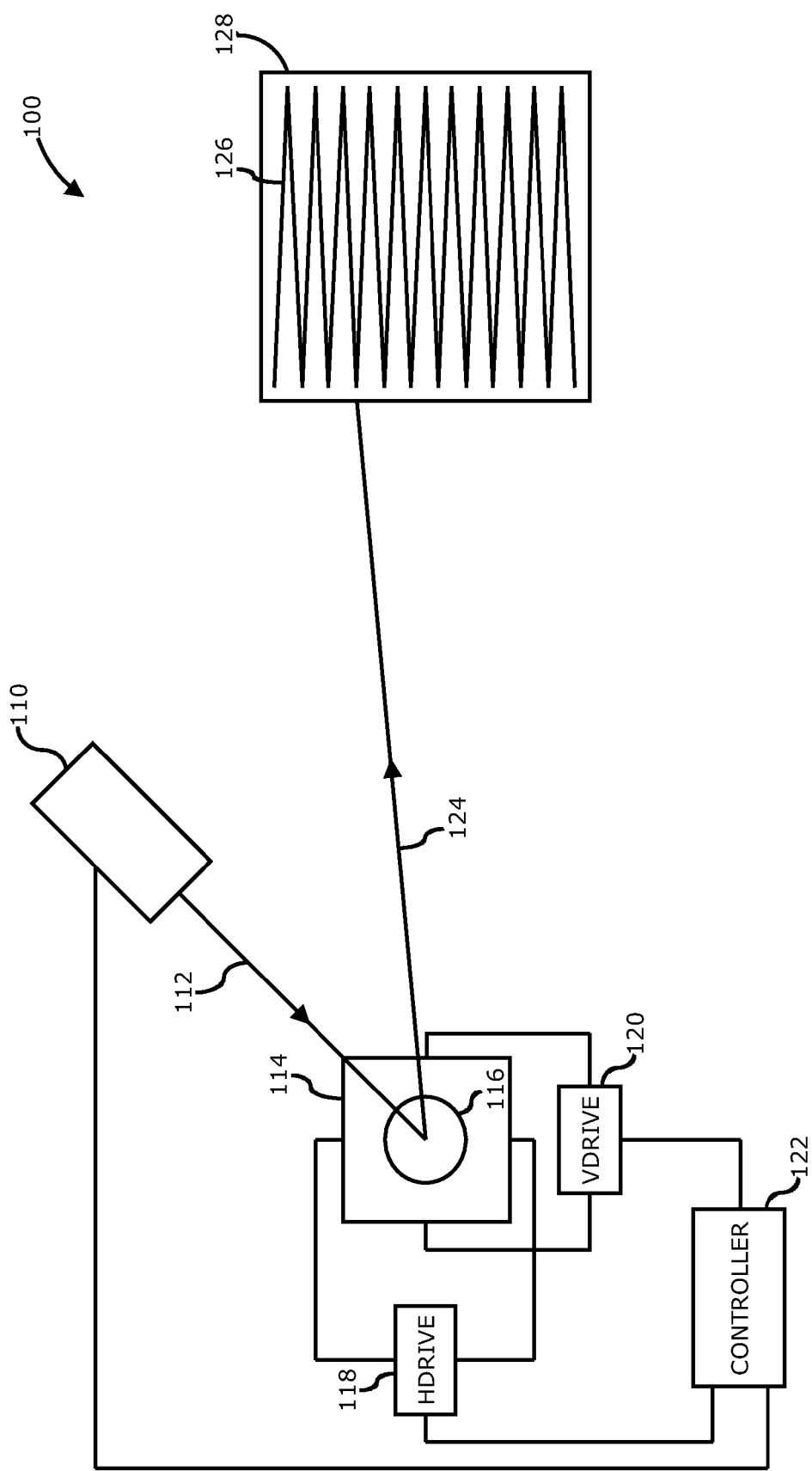
FIG. 1 is a diagram of a microelectromechanical system (MEMS) based scanned beam display in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 2:
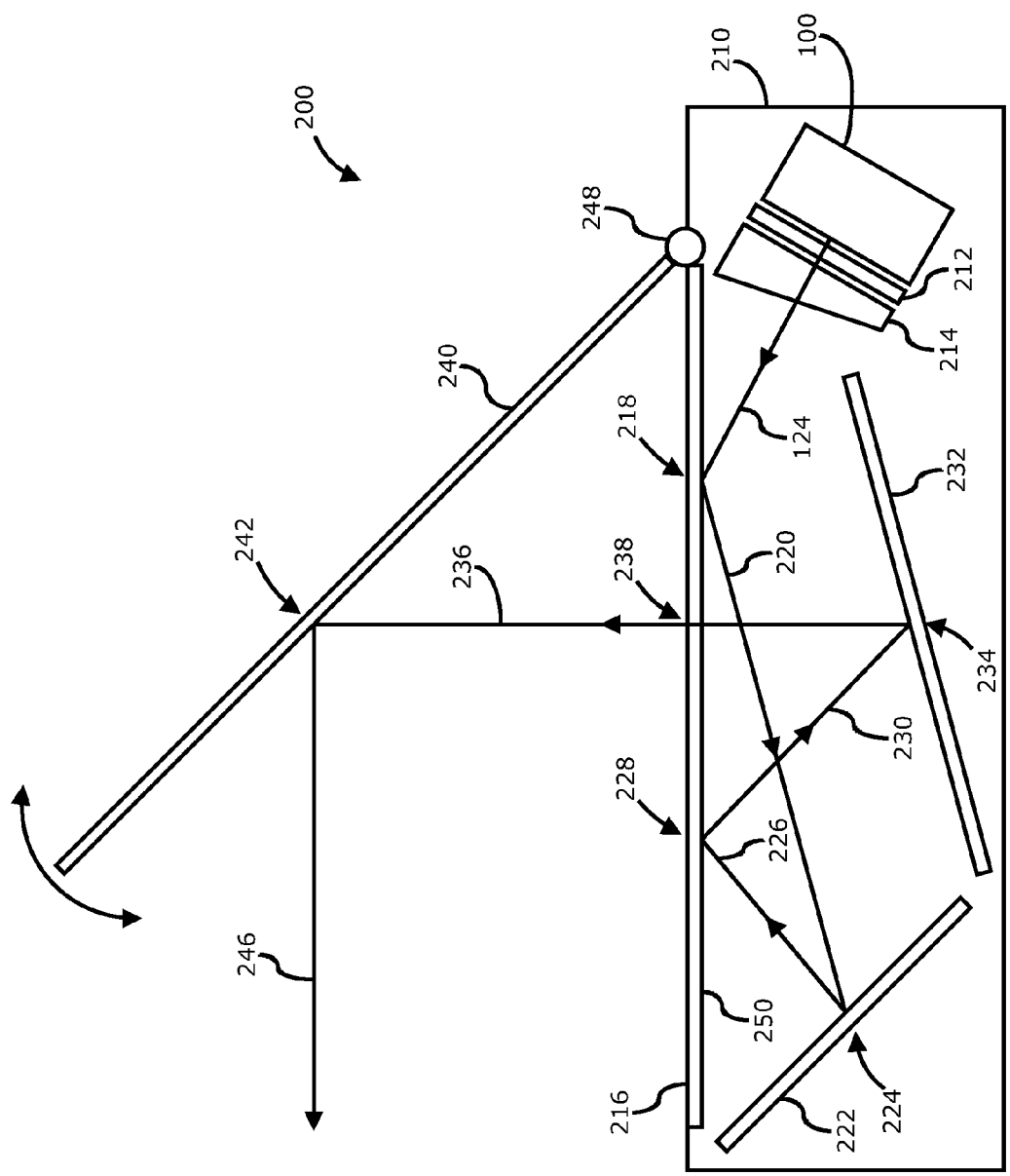
FIG. 2 is a diagram of a an optical relay of a compact head up display in accordance with one or more embodiments.

Referring now to FIG. 1, a diagram of a microelectromechanical system (MEMS) based scanned beam display in accordance with one or more embodiments will be discussed. Although FIG. 1 illustrates a scanned beam display system for purposes of discussion, it should be noted that a scanned beam imaging system, other types of imaging systems may be utilized in one or embodiments, and/or alternatively imaging systems such as a bar code scanner or digital camera could likewise be utilized in accordance with one or more embodiments, and the scope of the claimed subject matter is not limited in this respect. Scanned beam display 100 may be utilized with an optical relay of a head up display (HUD) as shown in FIG. 2 and/or FIG. 3 as discussed, below. It should be noted that although a scanned beam display 100 is shown in FIG. 1 as an example display module for a HUD as discussed herein, display 100 may comprise other types of displays such as a liquid crystal display (LCD), liquid crystal on silicon (LCOS) display, or a digital light projector (DLP), as one of many examples, and the scope of the claimed subject matter is not limited in this respect.

As shown in FIG. 1, scanned beam display 100 comprises a light source 110, which may be a laser light source such as a laser or the like, capable of emitting a beam 112 which may comprise a laser beam. In some embodiments, light source may comprise two or more light sources, such as in a color system having red, green, and blue light sources, wherein the beams from the light sources may be combined into a single beam. The beam 112 impinges on a scanning platform 114 which may comprise a microelectromechanical system (MEMS) based scanner or the like, and reflects off of scanning mirror 116 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning devices. A horizontal drive circuit 118 and/or a vertical drive circuit 120 modulate the direction in which scanning mirror 116 is deflected to cause output beam 124 to generate a raster scan 126, thereby creating a displayed image 128, for example on a projection surface and/or image plane. A display controller 122 controls horizontal drive circuit 118 and vertical drive circuit 120 by converting pixel information of the displayed image into laser modulation synchronous to the scanning platform 114 to write the image information as displayed image 128 based upon the position of the output beam 124 in raster pattern 126 and the corresponding intensity and/or color information at the corresponding pixel in the image. Display controller 122 may also control other various functions of scanned beam display 100.

In one or more embodiments, for two dimensional scanning to generate or capture a two dimensional image, a fast scan axis may refer to the horizontal direction of raster scan 126 and the slow scan axis may refer to the vertical direction of raster scan 126. Scanning mirror 116 may sweep the output beam 124 horizontally at a relatively higher frequency and also vertically at a relatively lower frequency. The result is a scanned trajectory of laser beam 124 to result in raster scan 126. However, the scope of the claimed subject matter is not limited in these respects.

Referring now to FIG. 2, a diagram of an optical relay of a compact head up display in accordance with one or more embodiments will be discussed. In one or more embodiments, optical relay 200 comprises a housing 210 in which display 100 such as a scanned beam display may be disposed. Alternatively, display 100 may comprise a liquid crystal display (LCD), a liquid crystal on silicon (LCOS) display, a digital light projector (DLP) display, and so on, and the scope of the claimed subject matter is not limited in this respect. In one or more embodiments, the light or light beam 124 emitted from display 100 may pass through a singlet lens 212 and/or a wedge 214. In one or more embodiments, singlet lens 212 may be used to ensure a flat field and/or that the eyebox is correctly positioned relative to the overall optical relay 200. Wedge 214 may be used to provide distortion correction such as correction of smile distortion and/or chromatic aberration. However in some embodiments, singlet lens 212 and/or wedge 214 may be optional and not utilized in some applications. In one or more embodiments, light or light beam 124 may comprise monochromatic light or alternatively may comprise polychromatic light, for example red (R), green (G), and blue (B) light (RGB) to represent a full color image projected by display 100, although the scope of the claimed subject matter is not limited in this respect.

In one or more embodiments, light beam 124 impinges on a surface 250 of glare trap 216 where glare trap 216 comprises a pane of glass, plastic, or other transparent material. Glare trap 216 may be relatively flat or planar in one or more embodiments, and may have some curvature on one or more surfaces in one or more alternative embodiments. As will be discussed in further detail with respect to FIG. 4, below, glare trap 216 may have an optical coating disposed thereon that functions as an angularly selective coating or filter. A suitable optical coating may comprise a multilayer dielectric coating to provide angular selectivity, and which may be obtained from optical product suppliers such as Cascade Optical Corporation of Santa Ana, Calif., USA or Deposition Sciences Inc of Santa Rosa, Calif., USA. In one or more embodiments, such a coating disposed on surface 250 of glare trap 216 allows glare trap 216 to be utilized as an optical surface in optical relay 200 multiple times, for example three times as shown in FIG. 2. The coating of glare trap 216 reflects light that is incident on surface 250 of glare trap that is greater than a first angle, for example greater than about 37 degrees where a line normal to surface 250 of glare trap 216 has a value of zero degrees. The coating of glare trap 216 may also efficiently transmit light that is incident on surface 250 of glare trap 216 at angles that are less than a second angle, for example less than about 10 degrees. In one or more embodiments, the first angle and the second angle have a separation of at least about 20 degrees or more. Such a relatively large angular separation between the first angle and the second angle between light that is reflected and light that is transmitted via operation of the coating may be designed to operate over a relatively wide range of wavelengths, for example to accommodate multiple wavelength content in light beam 124 such as where light beam comprises RGB light, although the scope of the claimed subject matter is not limited in this respect.

As shown in FIG. 2, light beam 124 emitted by display 100 impinges on surface 250 of glare trap 216 at location 218 at an angle of greater than the first angle, which may be 37 degrees in one or more embodiments. As a result, light beam 124 is reflected off surface 250 of glare trap 216 as reflected beam 220 where it is directed to secondary optic 222. Secondary optic 222 may have some curvature to its shape and may comprise a curved mirror surface to provide focusing and/or magnification of the projected image. Secondary optic 222 may comprise any suitable optical element such as a mirror or a lens, and the scope of the claimed subject matter is not limited in this respect. Reflected beam 220 impinges on secondary optic 222 at location 224 to be redirected back toward glare trap 216 as reflected beam 226. Reflected beam 226 impinges on surface 250 of glare trap 216 at location 228 at an angle that is greater than the first angle, and is therefore reflected by the coating as reflected beam 230. Reflected beam 230 then impinges on primary optic 232 at location 234 and is redirected back toward glare trap 216 as light beam 236. Primary optic 232 may also have a curved shape and may comprise a curved mirror surface to provide focusing and/or magnification of the projected image. Primary optic 232 may comprise any suitable optical element such as a mirror or a lens, and the scope of the claimed subject matter is not limited in this respect. Since light beam 236 impinges on surface 250 of glare trap 216 at location 238 at an angle equal to or less than the second angle, which may be 10 degrees in one or more embodiments, light beam 236 is allowed to efficient pass through the coating disposed on surface 250 of glare trap 216 and exits housing 210.

After light beam 236 exits housing 210, light beam 236 may impinge on a combiner 240 at location 242 and be redirected toward the eye of the operator in the HUD eyebox as beam 246. Combiner 240 allows the image relayed by optical relay 200 to be combined with light incoming to the operator's eye from the ambient environment such as light entering into the vehicle from the outside of the vehicle. In one or more embodiments, combiner 242 may be coupled to housing 210 of optical relay 200 via hinge 248 to allow the angle of combiner 240 be adjusted to an optimum or near optimum angle according to the operator. Likewise, such an arrangement of combiner 242, housing 210, and hinge 248 allows optical relay 200 of the HUD to be contained in a compact form factor suitable for after market installation or use of the HUD, for example housing 210 may be on a dashboard of a vehicle in the vehicle's interior space, although the scope of the claimed subject matter is not limited in this respect. An alternative arrangement of an optical relay for a HUD that is integrated into a vehicle is shown in and described with respect to FIG. 3, below.

Figure 3:
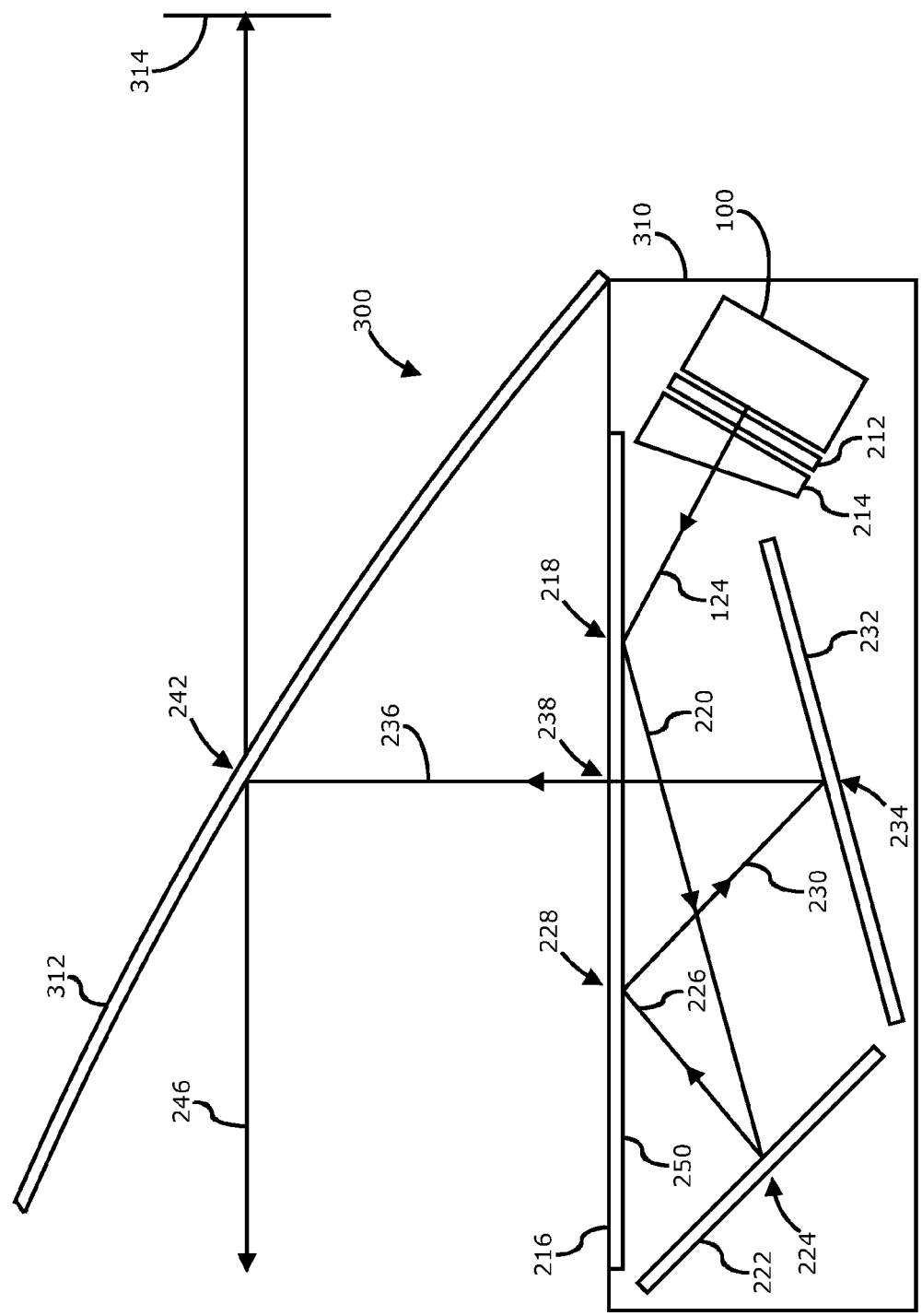
FIG. 3 is a diagram of an optical relay in an alternative compact head up display in accordance with one or more embodiments.

Referring now to FIG. 3, a diagram of an optical relay for an alternative compact head up display in accordance with one or more embodiments will be discussed. In one or more embodiments optical relay 300 of FIG. 3 may be substantially similar to optical relay 200 of FIG. 2 except that the components of optical relay 300 may be disposed within a dashboard 310 of the vehicle or similar location, and/or the windshield 312 of the vehicle may be function as the combiner 240 of FIG. 2, or alternatively combiner 240 could be integrated with or otherwise disposed in or on windshield 312. Furthermore, FIG. 3 illustrates that optical relay 300 of FIG. 3 may function to place the apparent image 314 projected by display 100 via optical relay 300 at a location outside of windshield 312, for example at a distance of about 1.5 meters from the operator/viewer. It should be noted that optical relay 200 of FIG. 2 may likewise place the apparent image at a selected distance from the operator/viewer as shown in FIG. 3 with optical relay 300, and the scope of the claimed subject matter is not limited in this respect.

Figure 4:
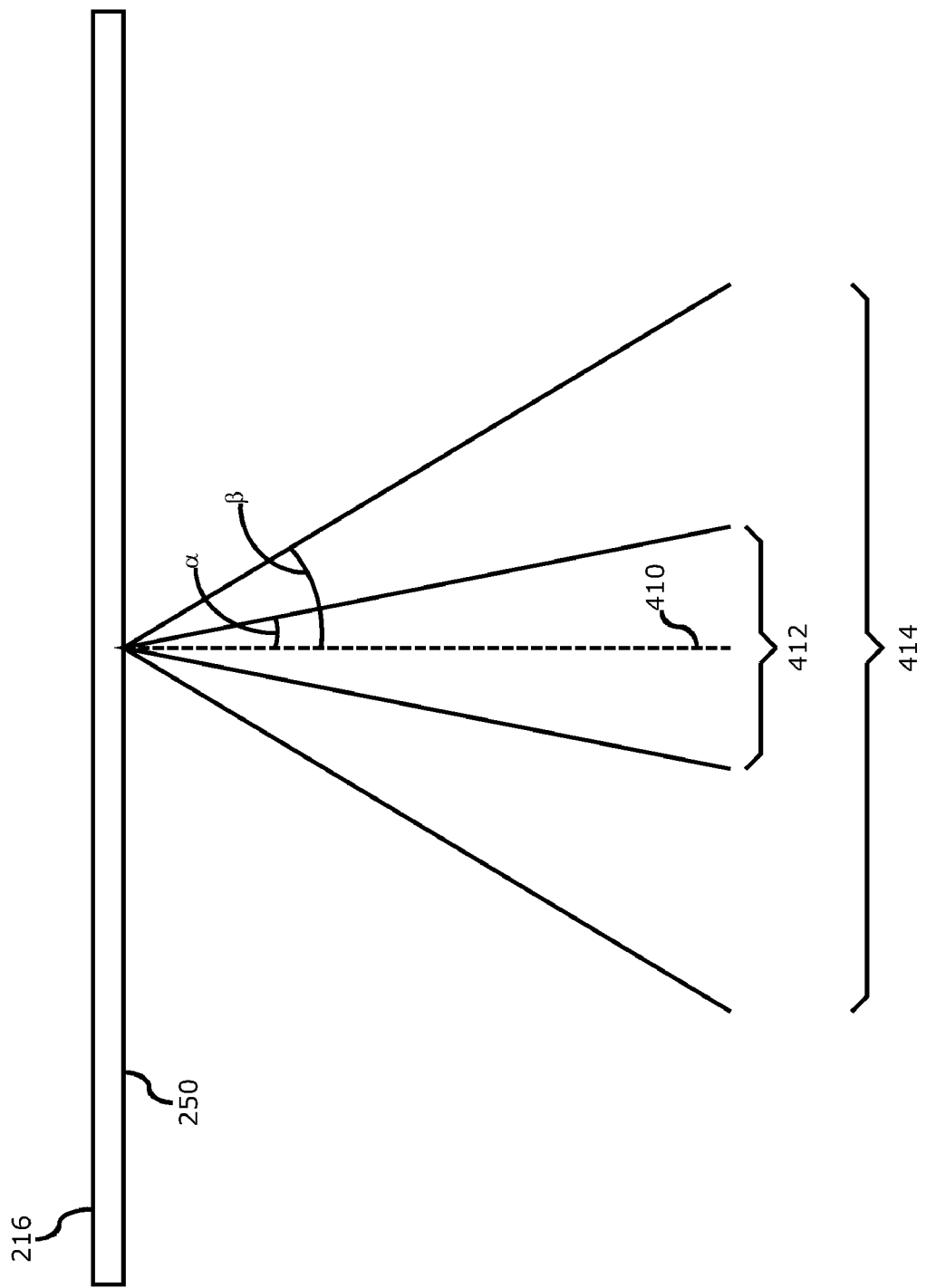
FIG. 4 is a diagram of a glare trap for an optical relay of a compact head up display in accordance with one or more embodiments.

Referring now to FIG. 4, a diagram of a glare trap for an optical relay of a compact head up display in accordance with one or more embodiments will be discussed. As shown in FIG. 4, glare trap 216 may have a suitable optical coating disposed on a surface 250 thereof that provides angular selectivity with respect an incident light beam. A normal line 410 with respect to a surface 250 of glare trap 216 may be designated as having an angle of zero degrees. Light rays that are incident on surface 250 of glare trap 216 greater than a first angle (β) are efficiently reflected by the coating and thus are not allowed to be transmitted through glare trap 216. In one or more embodiments, the first angle (β) is about 37 degrees. As a result, cone 414 is defined such that any incident light rays having an angle of incidence outside of cone 414 will be reflected by the coating. Likewise, light rays that are incident on surface 250 of glare trap 216 less than a second angle (α) are efficiently transmitted through the coating and are thus allowed to be transmitted through glare trap 216. As a result, cone 412 is defined such that any incident light rays have an angle of incidence inside of cone 412 will pass through the coating. In one or more embodiments, the first angle and the second angle have a separation of about 20 degrees or more, although the scope of the claimed subject matter is not limited in this respect. An optical coating having such an angular selectivity property may be formulated by an optical supply company using suitable materials and/or compounds. Furthermore, such an angular selectivity property of the coating allows a single optical element, which in this embodiment is glare trap 216, to be utilized multiple times in an optical light path of optical relay 200 or optical relay 300 to provide multiple functions in the same optical relay. For example, as shown in FIG. 2 and FIG. 3, light impinges on glare trap 216 three times in a single light path of optical relay 200 or optical relay 300. Alternatively, other embodiments of an optical relay for a HUD display may be constructed to have light incident on glare trap 216 two times in the optical path, or four or more times in yet further alternative embodiments, and the scope of the claimed subject matter is not limited in this respect. Furthermore, in one or more embodiments, glare trap 216 may be constructed to have one or more additional coatings, or the angular selective coating may be additionally formulated, to provide other optical properties or functionality, such as a polarizing coating and/or filters, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to an optical relay for a compact head up display and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An optical relay for a head up display, the optical relay comprising:
    a glare trap having angularly selectivity reflecting light having an angle of incidence greater than a first angle, and transmitting light having an angle of incidence less than a second angle;
    a first optic arranged to receive light reflected off the glare trap at an angle of incidence greater than the first angle, and to direct light through the glare trap at an angle of incidence less than the second angle to exit the glare trap; and
    a second optic arranged to receive the light reflected off the glare trap at an angle of incidence greater than the first angle a first time, and to redirect light to the first optic that is reflected off the glare trap at an angle of incidence greater than the first angle a second time.

2. An optical relay as claimed in claim 1, wherein the first optic comprises a primary lens or a primary mirror, or combinations thereof, and the second optic comprises a secondary lens or a secondary mirror or combinations thereof.

3. An optical relay as claimed in claim 1, further comprising a singlet lens disposed between a display and the glare trap to provide a relatively flat field or to position an eyebox, or combinations thereof.

4. An optical relay as claimed in claim 1, further comprising a wedge optic disposed between a display and the glare trap to adjust optical distortion in an image projected by the display.

5. An optical relay as claimed in claim 1, wherein light is incident upon the glare trap two or more times before passing through the glare trap.

6. An optical relay as claimed in claim 1, wherein the glare trap has an optical coating disposed on a surface thereof to provide the angular selectivity of the glare trap.

7. An optical relay as claimed in claim 1, further comprising a combiner to combine the light exiting the glare trap with ambient light incoming to an eye of a viewer.

8. An optical relay as claimed in claim 1, wherein the first optic operates to provide an apparent magnified image disposed at a selected distance from a viewer.

9. An optical relay as claimed in claim 1, wherein the first angle and the second angle are separated by about 20 degrees or more.

10. A head up display, comprising:
    a housing;
    a display module disposed in the housing; and
    optical relay disposed in the housing, the optical relay comprising:
    a glare trap having angularly selectivity reflecting light emitted from the display having an angle of incidence greater than a first angle, and transmitting light having an angle of incidence less than a second angle;
    a first optic arranged to receive light reflected off the glare trap at an angle of incidence greater than the first angle, and to direct light through the glare trap at an angle of incidence less than the second angle to exit the housing through the glare trap; and
    a second optic arranged to receive the light reflected off the glare trap at an angle of incidence greater than the first angle a first time, and to redirect light to the first optic that is reflected off the glare trap at an angle of incidence greater than the first angle a second time.

11. A head up display as claimed in claim 10, further comprising a singlet lens disposed between the display and the glare trap to provide a relatively flat field or to position an eyebox, or combinations thereof, or a wedge optic disposed between the display and the glare trap to adjust optical distortion in an image projected by the display, or combinations thereof.

12. A head up display as claimed in claim 10, wherein the glare trap has an optical coating disposed on a surface thereof to provide the angular selectivity of the glare trap.

13. A head up display as claimed in claim 10, wherein the first optic operates to provide an apparent magnified image disposed at a selected distance from a viewer.

14. A head up display as claimed in claim 10, wherein the first angle and the second angle are separated by about 20 degrees or more.

15. A head up display as claimed in claim 10, wherein the display emits light at three separate wavelengths, and the angular selectivity of the glare trap functions for all of the three separate wavelengths.

* * * * *